US009105094B2

(12) United States Patent
Tijssen

(10) Patent No.: US 9,105,094 B2
(45) Date of Patent: Aug. 11, 2015

(54) IMAGE LAYERS NAVIGATION

(71) Applicant: Adobe Systems Incorporated, San Jose, CA (US)

(72) Inventor: Remon Tijssen, Mill Valley, CA (US)

(73) Assignee: Adobe Systems Incorporated, San Jose, CA (US)

(*) Notice: Subject to any disclaimer, the term of this patent is extended or adjusted under 35 U.S.C. 154(b) by 52 days.

(21) Appl. No.: 14/043,639

(22) Filed: Oct. 1, 2013

(65) Prior Publication Data

US 2015/0093029 A1 Apr. 2, 2015

(51) Int. Cl.
*G06K 9/00* (2006.01)
*G06T 7/00* (2006.01)

(52) U.S. Cl.
CPC ................... *G06T 7/0079* (2013.01)

(58) Field of Classification Search
CPC .......... G06K 9/46; G06T 11/20; G06T 11/60; G06T 15/005; G06T 15/205; G06T 19/00; G06T 19/20; G06T 2210/61; G06T 2219/2016; G06T 2219/2024; G06F 3/04842; G06F 9/4443; G01C 21/28; G01C 21/3635; G01C 21/3638; G05B 19/409; G05B 2219/32128; G06Q 10/10; G11B 27/028; G11B 27/36
See application file for complete search history.

(56) References Cited

U.S. PATENT DOCUMENTS

| 6,903,751 | B2 * | 6/2005 | Saund et al. | 345/619 |
| 7,904,876 | B1 * | 3/2011 | Critz | 717/104 |
| 8,028,243 | B1 * | 9/2011 | O'Riordan | 715/765 |
| 8,170,380 | B1 * | 5/2012 | Gilra | 382/309 |
| 2013/0222385 | A1 * | 8/2013 | Dorsey et al. | 345/427 |
| 2014/0250059 | A1 * | 9/2014 | Gilra | 707/609 |
| 2014/0250411 | A1 * | 9/2014 | Gilra et al. | 715/811 |

* cited by examiner

*Primary Examiner* — Jose Couso
(74) *Attorney, Agent, or Firm* — Wolfe-SBMC

(57) ABSTRACT

In embodiments of image layers navigation, a canvas interface displays image segments of an image in different layers of the image. An image layers application is implemented to receive a position input of a canvas viewer control that encompasses one or more of the image segments of the image, and then determine the layers of the image that correspond to the image segments encompassed by the canvas viewer control. The position input of the canvas viewer control is effective to select the layers of the image that correspond to the one or more image segments encompassed by the canvas viewer control. Thumbnail images are then displayed that each represent one of the layers encompassed by the canvas viewer control, where each of the layers represented by a thumbnail image are displayed to include the image segments associated with a respective layer of the image.

20 Claims, 8 Drawing Sheets

IMAGE LAYERS NAVIGATION

BACKGROUND

Many types of industries utilize image editing and processing applications, such as for illustrations, graphic design, video editing, animation, and 3D modeling. Computing devices, such as desktop computers and any type of mobile devices, can display user interfaces of the image editing applications through which a user may create, view, and edit the many different types of images, videos, and graphics. Often, digital images for graphics and illustration applications are created as a compilation of image segments and/or objects on multiple, different layers of an image, and the layers are presented together to display the overall image. However, conventional image editing applications have poor visual reference mechanisms to select and interact with the individual or selected groups of layers of an image. Generally, the layer representations for an image are disconnected from the image, and are typically organized based on a numerical z-order layering of the image layers, rather than how the image segments or objects of the layers appear in the displayed image. Additionally, the more layers used to create an image, the more difficult it is for a user to determine and select individual or groups of the layers for viewing and editing.

SUMMARY

This Summary introduces features and concepts of image layers navigation, which is further described below in the Detailed Description and/or shown in the Figures. This Summary should not be considered to describe essential features of the claimed subject matter, nor used to determine or limit the scope of the claimed subject matter.

Image layers navigation is described. In embodiments, a canvas interface displays image segments of an image in different layers of the image. An image layers application is implemented to receive a position input of a canvas viewer control that encompasses one or more of the image segments of the image, and then determine the layers of the image that correspond to the image segments encompassed by the canvas viewer control. The position input of the canvas viewer control is effective to select the layers of the image that correspond to the one or more image segments encompassed by the canvas viewer control. Thumbnail images are then displayed that each represent one of the layers encompassed by the canvas viewer control, where each of the layers represented by a thumbnail image are displayed to include the image segments associated with a respective layer of the image.

In implementations, the canvas viewer control is implemented to at least partially encompass the one or more image segments of the image effective to select the layers of the image that correspond to the image segments. Alternatively, the canvas viewer control is implemented to fully encompass the one or more image segments of the image effective to select the layers of the image. The image layers application can also be implemented to initiate that image segments of the image not encompassed by the canvas viewer control are displayed visually contrasted, such as in a gray scale, to indicate a non-selection of the image segments. A user can also increase a size of the canvas viewer control to encompass additional layers of the image, or decrease the size of the canvas viewer control to encompass fewer layers of the image.

In implementations, the image layers application is implemented to receive thumbnail image selection inputs, such as when a user selects one or more of the displayed thumbnail images that each represent one of the layers encompassed by the canvas viewer control. The image segments of the image that are associated with the layers represented by the selected thumbnail images are grouped together, and the group of image segments is maintained as a selectable image group that is displayable at any selected position on the canvas interface.

BRIEF DESCRIPTION OF THE DRAWINGS

Embodiments of image layers navigation are described with reference to the following Figures. The same numbers may be used throughout to reference like features and components that are shown in the Figures.

DETAILED DESCRIPTION

Embodiments of image layers navigation are described, which enables a user to separate and navigate the layers of an image that is displayed on a canvas interface, and visual references of the layers are displayed on the canvas interface. A canvas viewer control is implemented in an image layers navigation mode, which provides user navigation and a view into the many separate layers of displayed images (e.g., to include digital images, videos, graphics, illustrations, etc.). The canvas viewer control is user-selectable to move around the canvas interface, and the canvas viewer control includes a viewport that provides an "xRay view" into the separate layers of a displayed image based on the image segments or objects of the image that are encompassed by the canvas viewer control.

In implementations, embodiments of image layers navigation are applicable for any type of application user interface that may be displayed for user interaction as related to image editing and processing, to include illustration editing, video compositing and editing, graphics and page layouts, architecture and building design, movie animation, 3D modeling, and any other type of application user interface. A canvas interface may also be implemented for other embodiments of image layers navigation, such as for data visualizations that include charts, graphs, plotted data points, filtering parameters of data sets, and/or for implementations that change over time, such as a data visualization that changes over a sequential time duration.

While features and concepts of image layers navigation can be implemented in any number of different devices, systems, networks, environments, and/or configurations, embodiments of image layers navigation are described in the context of the following example devices, systems, and methods.

Figure 1:
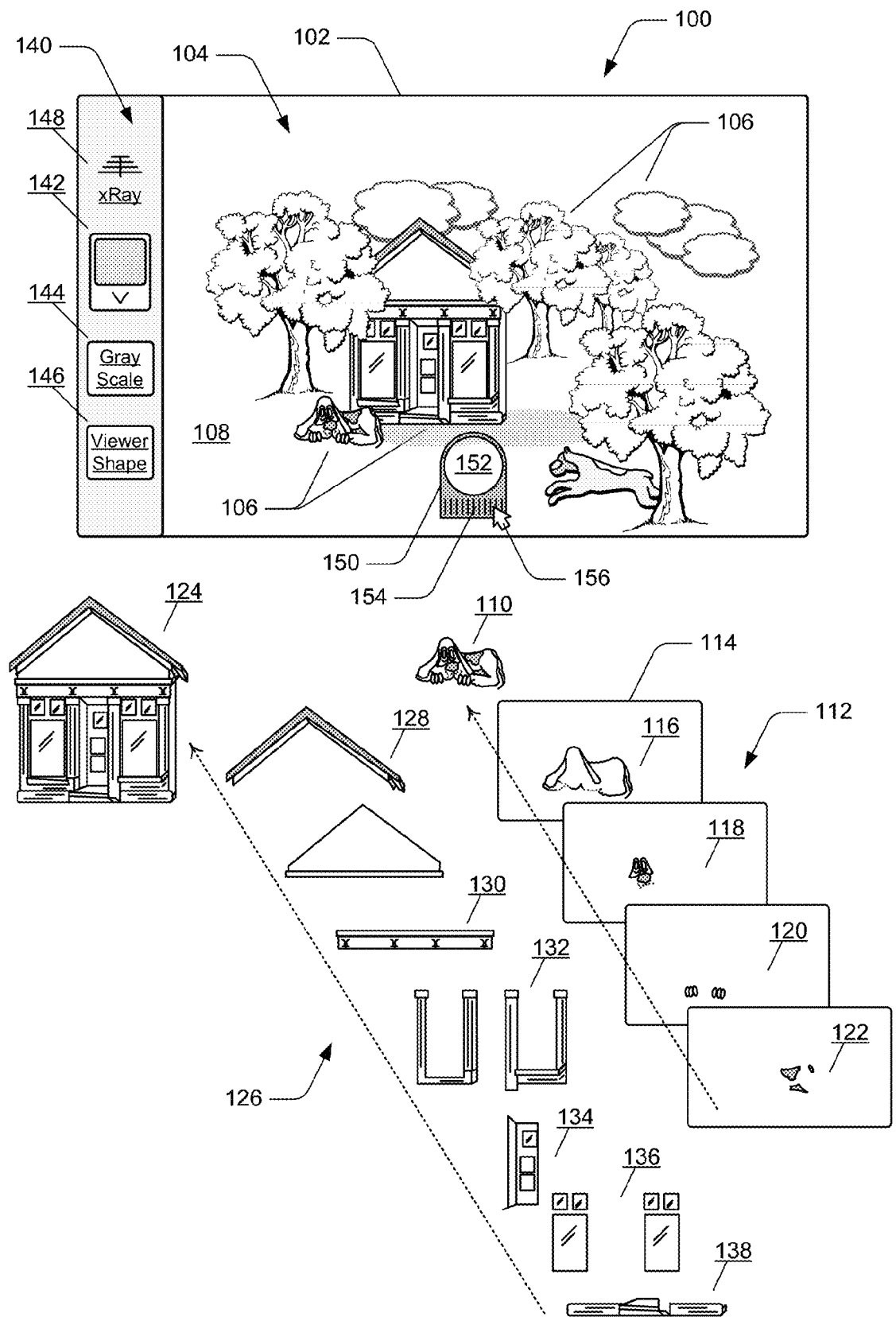
FIG. 1 illustrates an example canvas interface that displays image segments of an image in different layers of the image in accordance with one or more embodiments of image layers navigation.

FIG. 1 illustrates an example 100 of a canvas interface 102 that displays image segments of an image 104 in different layers of the image in embodiments of image layers navigation. The canvas interface 102 can be displayed on any type of display device that is connected to, or integrated with, a computing device, such as any type of computer, mobile phone, tablet device, or any other electronic media device that implements an image layers application (e.g., a software application) in embodiments of image layers navigation. A computing device can be implemented with various components, such as a processing system and memory, and with any number and combination of differing components as further described with reference to the example device shown in FIG. 8.

The canvas interface 102 is an example of any type of application user interface that may be displayed for user interaction as related to image editing and processing, to include illustration editing, video compositing and editing, graphics and page layouts, architecture and building design, movie animation, 3D modeling, and any other type of application user interface. The canvas interface 102 may also be implemented for other embodiments of image layers navigation, such as for data visualizations that include charts, graphs, plotted data points, filtering parameters of data sets, and/or for implementations that change over time, such as a data visualization that changes over a sequential time duration.

In this example 100, the image 104 that is displayed on the canvas interface 102 includes multiple, different image objects 106, such as a building, trees, clouds, and dogs. The image 104 also has a background 108 that includes a shadow of the building. In many of the image editing applications described above, a user may develop or create a digital image on many different layers of the image that are then displayed together on the canvas interface to appear as the overall image. Often an image may include a large number of layers, and in this example, not only are the different image objects (e.g., the building, trees, clouds, dogs, and building shadow) on separate layers, but also any of the image objects may be a combination of separable image segments that are also created on respective, different layers of the overall image.

For example, an image object 110 is one of the dogs shown in the image 104, and the image object is a combination of image segments 112 that are each on separate layers 114 of the image, such as a body 116 of the dog, his facial features 118, front feet 120, and his markings 122. Similarly, another image object 124 is the building that is shown in the image 104, and the image object is a combination of image segments 126 that are each on separate layers of the image, such as roof structures 128, a header beam 130, support columns 132, the building door 134, the windows 136, and the building base structure 138. Although not shown specifically, the image segments 126 of the image object 124 are each on a separate layer of the image 104, as similarly represented by the layers 114 that correspond to the image segments 112 of the image object 110. When displayed on the canvas interface 102 as part of the one image 104, the separate layers 114 that include the respective image segments 112 of the image object 110 are displayed together and appear as the dog displayed in front of the separate layers that include the respective image segments 126 of the image object 124, which are displayed together as the building.

In this example 100, the canvas interface 102 includes a selectable controls region 140 of user selectable controls that may be selected by a user to initiate different features and/or modes of image layers navigation. The selectable controls in the selectable controls region 140 include a viewer 142 for selectable image groups, a gray scale control 144, and a viewer shape control 146, all of which are further described below as features and/or modes in embodiments of image layers navigation. The selectable controls region 140 also includes an "xRay" user selectable control 148 that may be selected by a user to initiate an image layers navigation mode, which provides user navigation and a view into the many separate layers of the displayed image 104. When initiated, the canvas interface 102 includes a canvas viewer control 150, which includes a viewport 152 that provides the "xRay view" into the many separate layers of the displayed image 104.

The canvas viewer control 150 is user-selectable, such as in a select region 154 of the canvas viewer control where a user can select and move the canvas viewer control around the canvas interface 102 to view into the layers of the displayed image 104. An example of the canvas viewer control 150 positioned to encompass image segments of the image 104 is shown and described with reference to FIG. 2. A user can select the canvas viewer control with a computer input device, such as a computer mouse device or any other type of input device, as shown at 156. Alternatively or in addition, a user may also initiate a selection of the canvas viewer control with a touch input and/or a touch gesture on a touchscreen device that recognizes user touch inputs to select and move the canvas viewer control around on the canvas interface.

Figure 2:
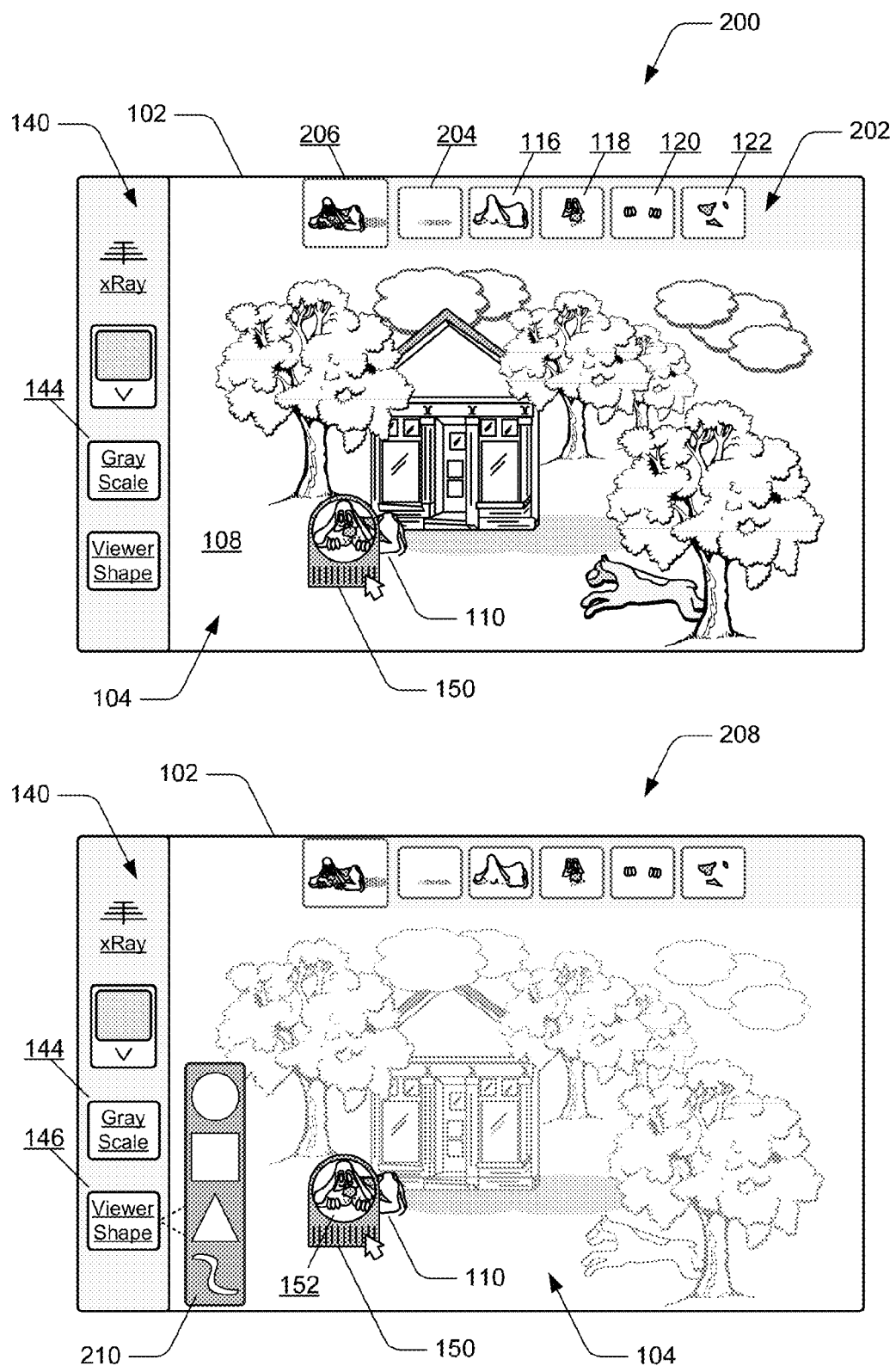
FIG. 2 illustrates an example of a canvas viewer control positioned on a canvas interface to view into the separate, different layers of a displayed image in accordance with one or more embodiments of image layers navigation.

FIG. 2 illustrates an example 200 of the canvas viewer control 150 positioned on the canvas interface 102 to view into some of the separate layers of the displayed image 104. The position of the canvas viewer control 150 on the canvas interface is effective to select the layers of the image 104 that correspond to image segments encompassed by the canvas viewer control, and the selected layers are displayed as thumbnail images 202 that provide a visual reference for the independent layers of the image. In this example, the canvas viewer control 150 is positioned to encompass the image segments 112 of the image object 110 (i.e., one of the dogs displayed in the image), as well as the image background 108 that includes the building shadow. Each of the layers of the image (or respective image objects) that include an image segment encompassed by the canvas viewer control 150 are displayed independently as the thumbnail images 202 along the top of the canvas interface. In implementations, the thumbnail images 202 may be displayed in any order or sequence, as well as anywhere on the canvas interface 102 or proximate the canvas interface, such as in the selectable controls region 140.

The thumbnail images 202 each represent one of the layers encompassed by the canvas viewer control 150, and each of the layers displayed in a thumbnail image includes the one or more image segments associated with a respective layer of the image. For example, the thumbnail images 202 of the layers include a thumbnail image 204 of the image background 108 (which includes the building shadow), as well as thumbnail images for each of the layers 114 of the image that include the image segments 112 of the body 116 of the dog, his facial features 118, front feet 120, and his markings 122. The thumbnail images 202 also include a combined layer thumbnail image 206 that displays all of the layers of the image that correspond to the image segments encompassed by the canvas viewer control. In this example, the combined layer thumbnail image 206 displays all of the image layers 114 together with the layer that includes the background 108 to display the dog (i.e., image object 110) over the background image.

In implementations, the canvas viewer control 150 at least partially encompasses image segments, such as at least one pixel of a displayed image segment, and the layers that correspond to the image segments of the image 104 are displayed as the thumbnail images 202. For example, the canvas viewer control 150 is shown to encompass the facial features 118 and front feet 120 of the dog (i.e., the image object 110), and only partially encompasses the body 116 of the dog and his markings 122, as well as a small portion of the background 108 of the overall image 104. The layers of the image that correspond to the image segments which are only partially encompassed by the canvas viewer control 150 are still displayed as one of the thumbnail images 202. Alternatively, the thumbnail images 202 can be displayed as the layers of the image that correspond to image segments which are fully encompassed by the canvas viewer control 150. In this example, only the layers of the image that correspond to the facial features 118 and front feet 120 of the dog (i.e., the image object 110) would be displayed as the thumbnail images because these image segments are fully encompassed by the canvas viewer control.

In addition to the thumbnail images 202 displayed on the canvas interface 102 to provide the visual reference of the separate layers 114 of the image 104, a user may select the gray scale control 144 in the selectable controls region 140 of the canvas interface 102 to initiate that image segments of the image 104 not encompassed by the canvas viewer control 150 are displayed visually contrasted, such as in a gray scale, to indicate the non-selection of the image segments. For example, as shown at 208, all of the image segments and image objects of the image 104 that are not at least partially encompassed by the canvas viewer control 150 are displayed in a gray scale. Alternatively or in addition, the non-selected image segments of the image may be displayed in other ways that also indicate the non-selection of the image segments, such as a color image displayed in lighter colors, displayed with dashed lines that outline image objects, and/or displayed with any other contrasting visual render of the layers.

In embodiments, the viewport 152 of the canvas viewer control 150 may also be configurable in different shapes, or initiated as a free-form selection tool that a user can utilize to draw a boundary around image segments of the image 104 (to include the image objects) displayed on the canvas interface 102. In implementations, a user may select the viewer shape control 146 in the selectable controls region 140 of the canvas interface 102 to toggle or sequence the shape of the viewport 152 of the canvas viewer control 150, or to initiate a shape menu 210 from which the user can select the shape and/or type of viewport 152 for the canvas viewer control. In a touchscreen implementation, a user may tap or double-tap on the current, displayed shape of the viewport 152, or on the canvas viewer control 150, to initiate the shape menu 210 being displayed above or proximate the canvas viewer control, such as in a horizontal or vertical strip of selectable shapes. In this example, the shape menu 210 of viewport shapes and types include a circle, square, triangle, and a free-form tool that the user can select. Additionally, any other shapes, styles, and types of viewport shapes may be displayed in the shape menu 210 for user selection, such as if a particular viewport shape makes it easier for the user to select certain image segments together.

Figure 3:
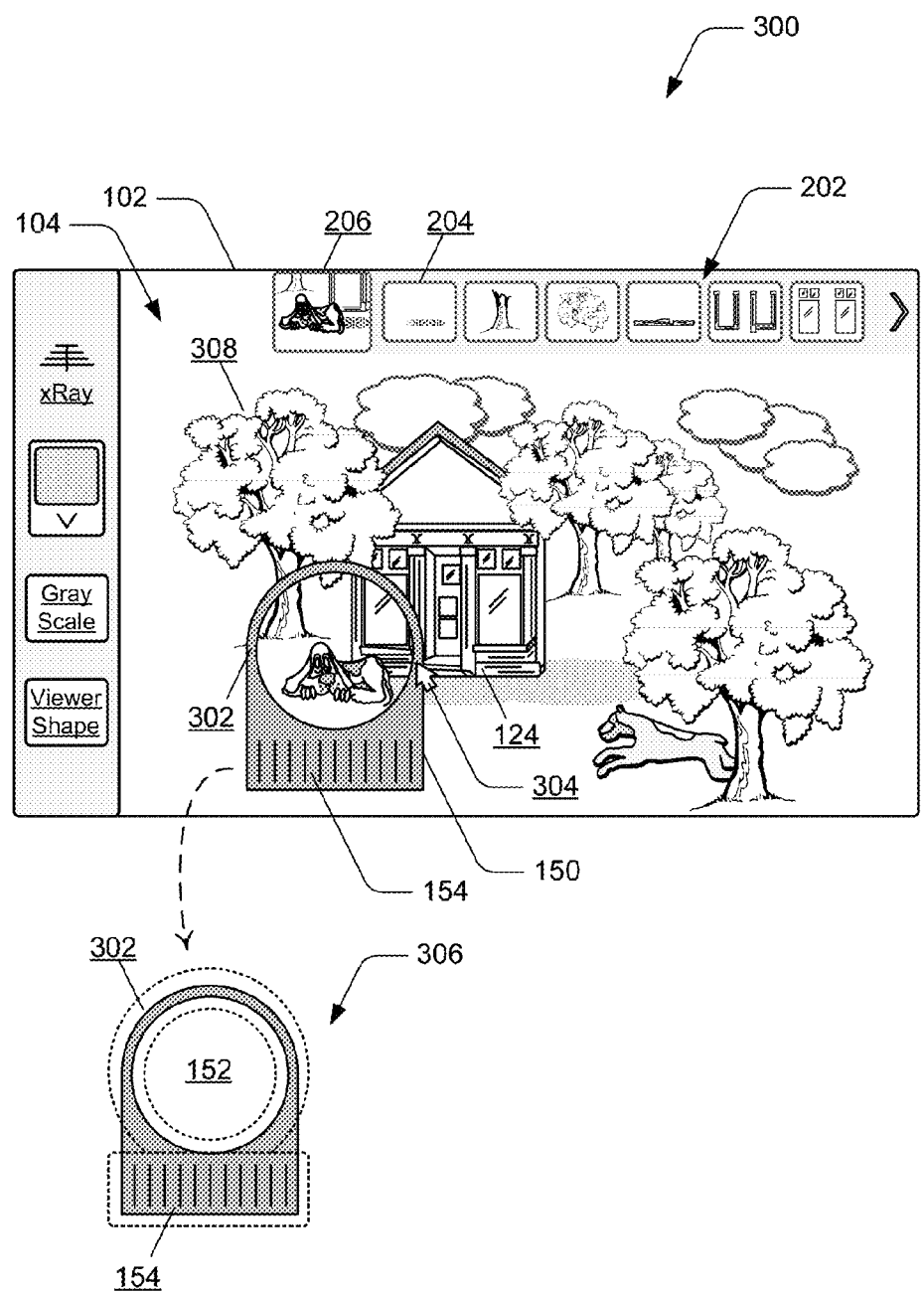
FIG. 3 illustrates an example feature of the canvas viewer control on the canvas interface in accordance with one or more embodiments of image layers navigation.

FIG. 3 illustrates an example 300 of the canvas viewer control 150 resized on the canvas interface 102 in embodiments of image layers navigation. In addition to the viewport 152 and the select region 154, the canvas viewer control 150 includes a zoom region 302 around the viewport 152 that a user can select, either with a device input 304 or with touch inputs on a touchscreen, to increase or decrease the size of the canvas viewer control. The zoom region 302 can be dragged to change the size of the viewport 152 in real-time, which also initiates real-time updates to the thumbnail images 202 that display the layers encompassed by the canvas viewer control as it is increased or decreased in size. In implementations for a touchscreen device, the select region 154 and the zoom region 302 of the canvas viewer control 150 may be expanded to include a larger touch contact response area around the canvas viewer control, such as shown at 306. Any other type of configurations and/or selectable regions may be implemented and utilized as well to facilitate touch contact response.

In this example 300, the size of the canvas viewer control 150 is increased, which encompasses additional image segments of the overall displayed image 104, and accordingly includes additional layers of the image. In addition to the thumbnail image 204 of the image background 108 (which includes the building shadow) and the thumbnail images for each of the layers 114 that include the image segments 112 of the dog (i.e., the image object 110), the thumbnail images 202 also include additional thumbnail images that represent the layers corresponding to the additional image segments encompassed by the increased size of the canvas viewer control. For example, the thumbnail images 202 also represent layers of the tree (i.e., an image object 308) that is encompassed by the canvas viewer control 150, as well as layers of the image object 124 for the image segments 126 of the building that are encompassed by the canvas viewer control. Alternatively, the size of the canvas viewer control 150 can be decreased, which may encompass fewer layers of the displayed image 104.

Similarly, if a user selects to zoom-in to the displayed image 104 itself without the canvas viewer control 150 being resized, then the canvas viewer control will likely encompass fewer layers of the image because the image segments viewed through the viewport 152 of the canvas viewer control will increase in size as the image is zoomed-in. Alternatively, if the user selects to zoom-out of the displayed image 104 itself without the canvas viewer control 150 being resized, then the canvas viewer control may encompass more layers of the image because the image segments viewed through the viewport 152 of the canvas viewer control will decrease in size as the image is zoomed-out.

In implementations, the thumbnail images 202 can be displayed in a display order based on a proximity of the image segments as displayed in the image 104 on the canvas interface 102. The display order of the thumbnail images 202 may not coincide with a numerical listing, such as a numerical z-order layering of the many different layers of the displayed image. For example, the image 104 may be comprised of a hundred layers, each with one or more image segments of the various image objects that make up the overall image 104. The layers for the image segments 112 of the dog (i.e., the image object 110) may be the image layers three through six (3-6) of the overall image 104, while the layers for the image segments 126 of the building (i.e., the image object 124) may be the image layers eighty-two through eighty-seven (82-87) of the image. Although the numerical z-order of the layers that correspond to the image segments 112 of the dog are not consecutive with the layers that correspond to the image segments 126 of the building, the layers for the dog can be displayed next to the layers for the building in the thumbnail images 202. A user can then easily select the layers that correspond to the dog and the building together. The display order of the thumbnail images 202 may also be displayed based on the type and/or format of the layers, such as based on vector layers, pixel layers, text layers, video layers, and/or based on other properties of the image layers.

Figure 4:
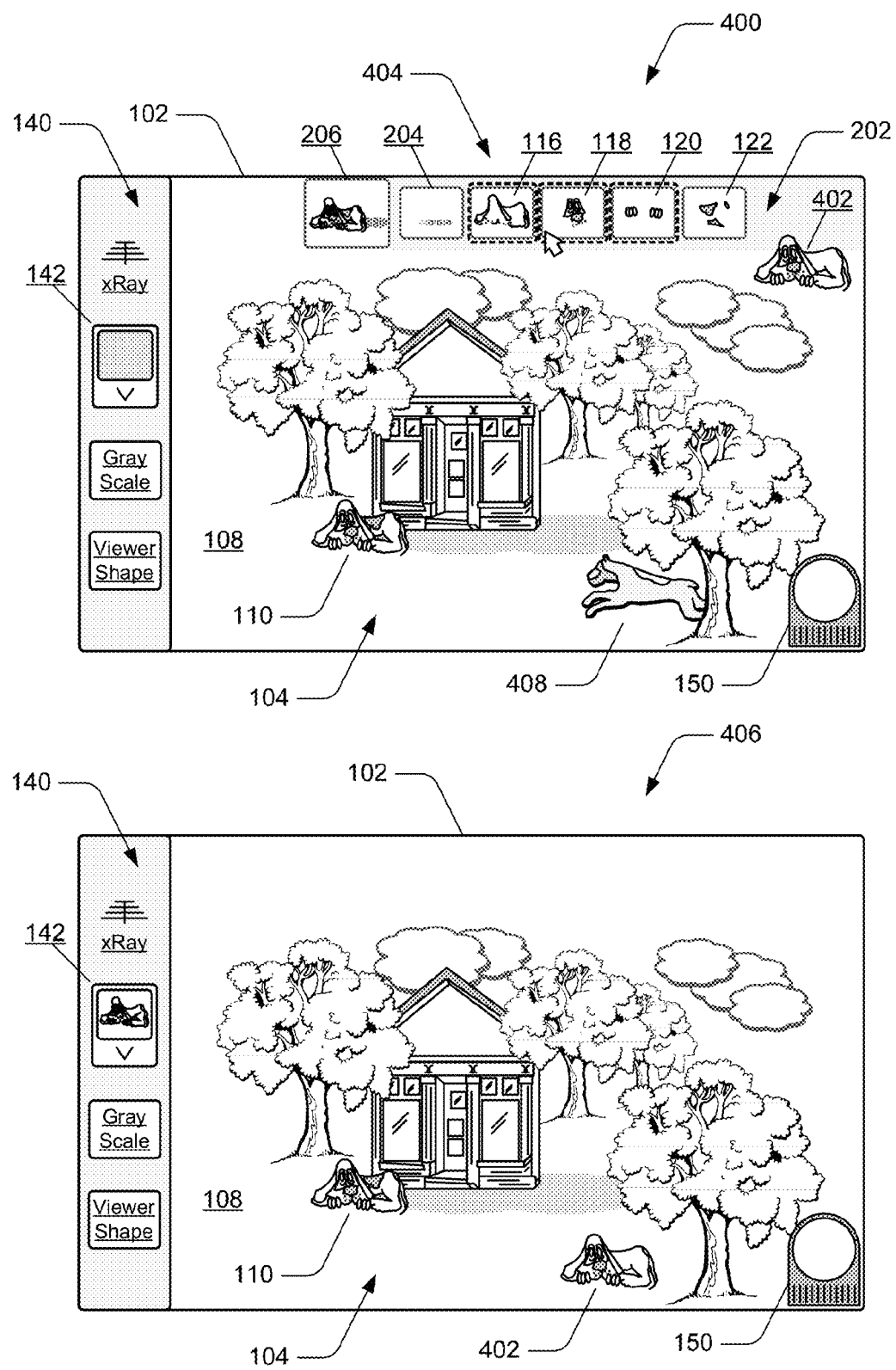
FIG. 4 illustrates an example of image layer selections to create a selectable image group in accordance with one or more embodiments of image layers navigation.

FIG. 4 illustrates an example 400 of image layer selections to create a selectable image group in embodiments of image layers navigation. In this example 400, a user can select any one or combination of the displayed thumbnail images 202 to group the image segments of the image 104 that are associated with the layers represented by the selected thumbnail images. The group of image segments can then be maintained as a selectable image group 402 that is displayable at any selected position on the canvas interface 102. For example, as shown at 404, a user can select with device inputs and/or touch inputs some of the thumbnail images 202 that include the image segments 112 of the dog (i.e., the image object 110), such as the layers that include the image segments of the body 116 of the dog, his facial features 118, and front feet 120.

In implementations, the canvas viewer control 150 moves off to the side of the canvas interface 102, or to another position, to indicate that the canvas viewer control is inactive while the thumbnail images are selected. A user can also utilize the embodiments of image layers navigation to edit the displayed image 104 on the canvas interface 102. For example, a user can simply select one of the thumbnail images 202 to delete the corresponding layer and associated image segments from the displayed image 104. Additionally, a user can copy-and-paste one of the thumbnail images 202 to create a new layer with the associated image segments in the displayed image. The user can then edit the image segments and/or image objects on the new layer.

As shown at 406, an image object 408 (i.e., the other dog displayed in the image 104) has been deleted from the image by deleting the layers that include the image segments of the image object. Further, the selectable image group 402 that was created from the image segments 112 of the image object 110 for the dog is positioned in the image 104 on the canvas interface 102. The layers of the selectable image group 402 are displayed together as another dog, but without the markings 122 of the image object 110. In embodiments, the viewer 142 in the selectable controls region 140 displays selectable image groups that have been created by the user, such as the selectable image group 402 of the new dog. The user can then sequence through the viewer 142 and select any previously created selectable image groups, and add a selected image group to the displayed image 104 at any position on the canvas interface 102. This provides that any previous selection of layers, which are saved together as an image object (including the data of the individual layers), can be selected and displayed as the combined layer thumbnail image 206 in the row of thumbnail images and/or displayed as part of the image 104 on the canvas interface, where the shape, location, and/or size of the image object can then be edited by the user.

Figure 5:
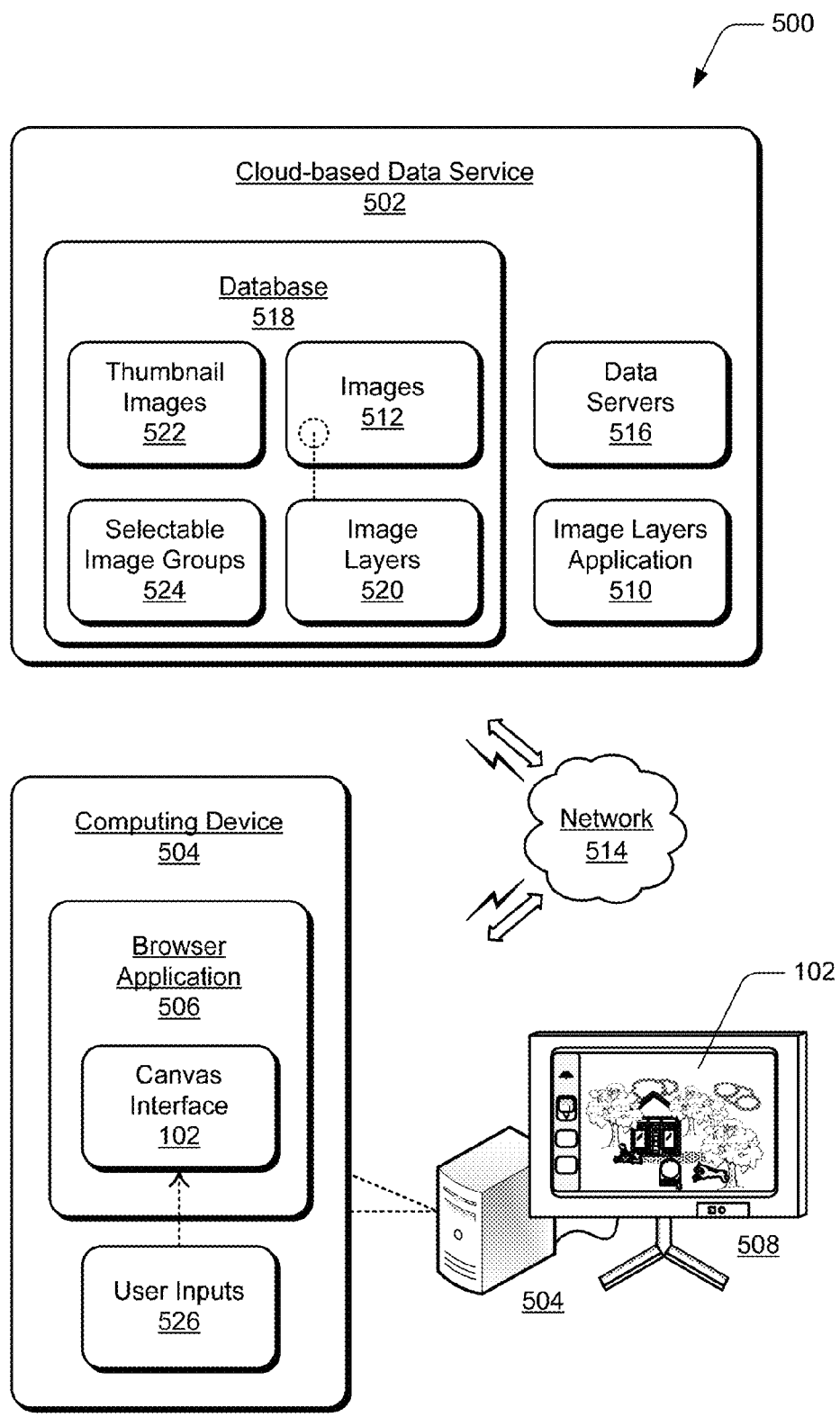
FIG. 5 illustrates an example system in which embodiments of image layers navigation can be implemented.

FIG. 5 illustrates an example system 500 in which embodiments of image layers navigation can be implemented. The example system 500 includes a cloud-based data service 502 that a user can access via a computing device 504, such as any type of computer, mobile phone, tablet device, and/or other type of computing device. The computing device 504 can be implemented with a browser application 506 through which a user can access the data service 502 and initiate a display of the canvas interface 102 to display layered images, also shown on a display device 508 that is connected to the computing device. The computing device 504 can be implemented with various components, such as a processing system and memory, and with any number and combination of differing components as further described with reference to the example device shown in FIG. 8.

In embodiments of image layers navigation, the cloud-based data service 502 is an example of a network service that provides an on-line, Web-based image layers application 510 that a user can log into from the computing device 504 and display the canvas interface 102. As described above, the network service may be utilized for any type of image editing and processing, to include illustration editing, video compositing and editing, graphics and page layouts, architecture and building design, movie animation, 3D modeling, and any other type of application user interface. The data service can also maintain and/or upload the images 512 that are displayed in the canvas interface 102.

Any of the devices, data servers, and networked services described herein can communicate via a network 514, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 502 includes data servers 516 that may be implemented as any suitable memory, memory device, or electronic data storage for network-based data storage, and the data servers communicate data to computing devices via the network 514. The data servers 516 maintain a database 518 of the images 512 that each have the multiple image layers 520 as described with reference to the image 104 that is displayed in the canvas interface 102 shown in FIGS. 1-4. The database 518 can also maintain the thumbnail images 522 that correspond to the image layers 520 of the respective images 512, as well as the selectable image groups 524 that are created by a user selecting and grouping any one or combination of the thumbnail images 522, as shown and described with reference to FIGS. 1-4.

The cloud-based data service 502 includes the image layers application 510, such as a software application (e.g., executable instructions) that is executable with a processing system to implement embodiments of image layers navigation. The image layers application 510 can be stored on a computer-readable storage memory, such as any suitable memory, storage device, or electronic data storage implemented by the data servers 516. Further, the data service 502 can include any server devices and applications, and can be implemented with various components, such as a processing system and memory, as well as with any number and combination of differing components as further described with reference to the example device shown in FIG. 8.

The data service 502 communicates the images data and canvas interface 102 of the image layers application 510 to the computing device 504 where the canvas interface is displayed, such as through the browser application 506 and displayed on the display device 508 of the computing device. The image layers application 510 also receives user inputs 526 to the canvas interface 102, such as when a user at the computing device 504 initiates a user input with a computer input device or as a touch input on a touchscreen. The computing device 504 communicates the user inputs 526 to the data service 502 via the network 514, where the image layers application 510 receives the user inputs.

In embodiments, the image layers application 510 implements the features of image layers navigation as shown and/or described with reference to FIGS. 1-4, 6, and 7. The image layers application 510 is implemented to receive a position input (e.g., such as a user input 526) of the canvas viewer control 150 that encompasses the image segments of a displayed image 512, and then scan the image to determine the image layers 520 of the image that correspond to the image segments encompassed by the canvas viewer control. The thumbnail images 522 are then displayed that each represent one of the image layers 520 encompassed by the canvas viewer control, where each of the layers represented by a thumbnail image are displayed to include the image segments associated with a respective layer of the image.

In implementations, the image layers application 510 can receive a user input 526 to initiate the image segments of a displayed image 512 that are not encompassed by the canvas viewer control 150 are displayed visually contrasted, such as in a gray scale, to indicate a non-selection of the image segments. The image layers application 510 can also increase a size of the canvas viewer control to encompass additional layers 520 of the displayed image, or decrease the size of the canvas viewer control to encompass fewer layers of the image. The image layers application is also implemented to receive user selection inputs of the thumbnail images 522, such as when a user selects any one or combination of the displayed thumbnail images that each represent one of the image layers 520 encompassed by the canvas viewer control. The image segments of a displayed image 512 that are associated with the image layers represented by the selected thumbnail images are grouped together, and the group of image segments is maintained as a selectable image group 524 that is displayable at any selected position on the canvas interface.

Example methods 600 and 700 are described with reference to respective FIGS. 6 and 7 in accordance with one or more embodiments of image layers navigation. Generally, any of the services, components, modules, methods, and operations described herein can be implemented using software, firmware, hardware (e.g., fixed logic circuitry), manual processing, or any combination thereof. The example methods may be described in the general context of executable instructions stored on a computer-readable storage memory that is local and/or remote to a computer processing system, and implementations can include software applications, programs, functions, and the like.

Figure 6:
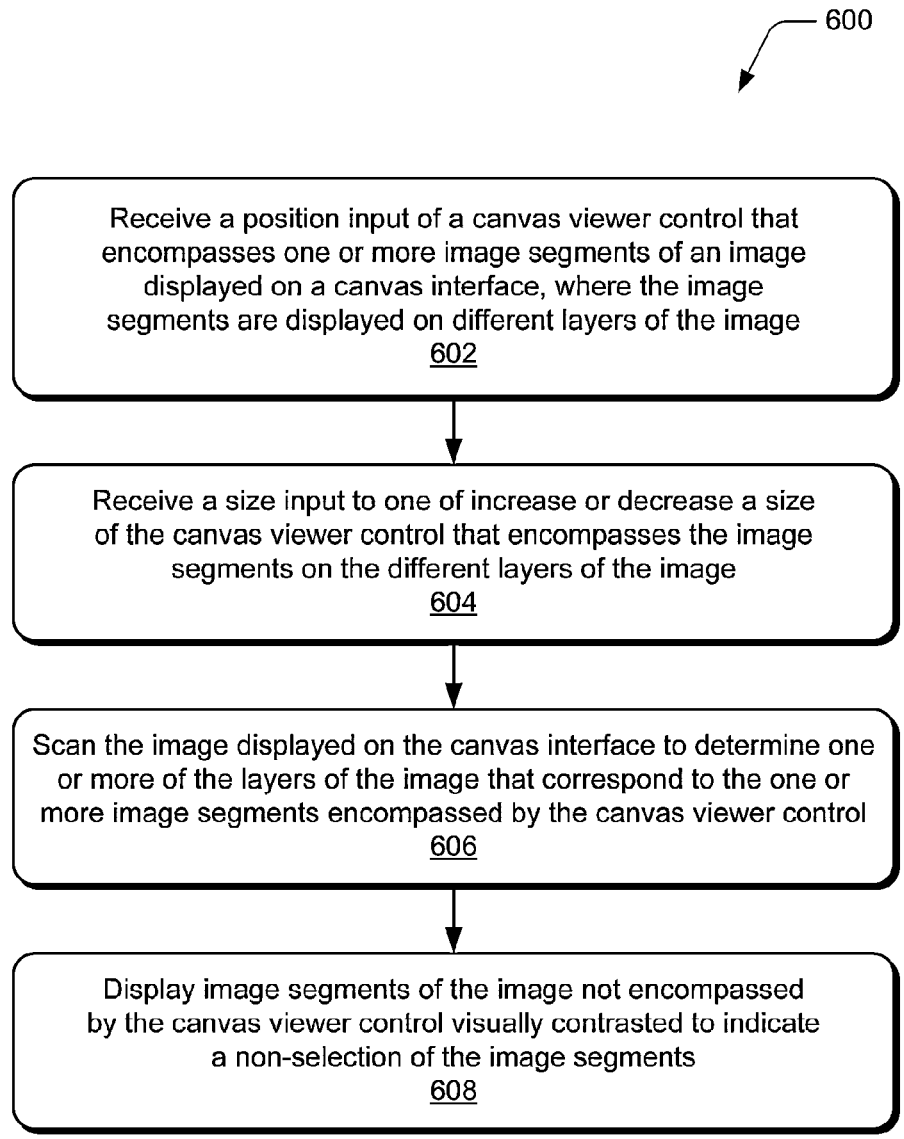
FIG. 6 illustrates example method(s) of image layers navigation in accordance with one or more embodiments.

FIG. 6 illustrates example method(s) 600 of image layers navigation, and is generally described with reference to an image layers application implemented by a computing device. The order in which the method is described is not intended to be construed as a limitation, and any number or combination of the method operations can be combined in any order to implement a method, or an alternate method.

At 602, a position input is received for a canvas viewer control that encompasses one or more image segments of an image displayed on a canvas interface, where the image segments are displayed on different layers of the image. For example, the image layers application 510 (FIG. 5) implemented by a computing device and/or at the cloud-based data service 502 receives a position input of the canvas viewer control 150 (shown in FIGS. 1-4), such as when a user selects and moves the canvas viewer control to encompass image segments 112 of an image object 110 displayed in the image 104 on the canvas interface 102.

At 604, a size input is received to one of increase or decrease a size of the canvas viewer control that encompasses the image segments displayed on the different layers of the image. For example, the image layers application 510 receives a size input, such as a user input to select and increase the size of the canvas viewer control 150 that encompasses additional layers of the image 104 displayed on the canvas interface 102. Alternatively, the image layers application 510 receives a size input, such as a user input to select and decrease the size of the canvas viewer control that encompasses fewer layers of the image displayed on the canvas interface.

At 606, the image displayed on the canvas interface is scanned to determine one or more of the layers of the image that correspond to the one or more image segments encompassed by the canvas viewer control. For example, the image layers application 510 scans the image 104 displayed in the canvas interface 102 to determine the layers of the image that correspond to the respective image segments encompassed by the canvas viewer control 150. Scanning the image to determine the layers of the image can be based on the canvas viewer control at least partially encompassing the image segments of the image effective to select the layers of the image that correspond to the image segments, or based on the canvas viewer control fully encompassing the image segments of the image effective to select the layers of the image.

At 608, image segments of the image not encompassed by the canvas viewer control are displayed visually contrasted to indicate a non-selection of the image segments. For example, the image layers application 510 initiates displaying the image segments of the image 104 in the canvas interface 102 that are not encompassed by the canvas viewer control 150 visually contrasted, such as in a gray scale as shown at 208 in FIG. 2, to indicate a non-selection of the image segments.

Figure 7:
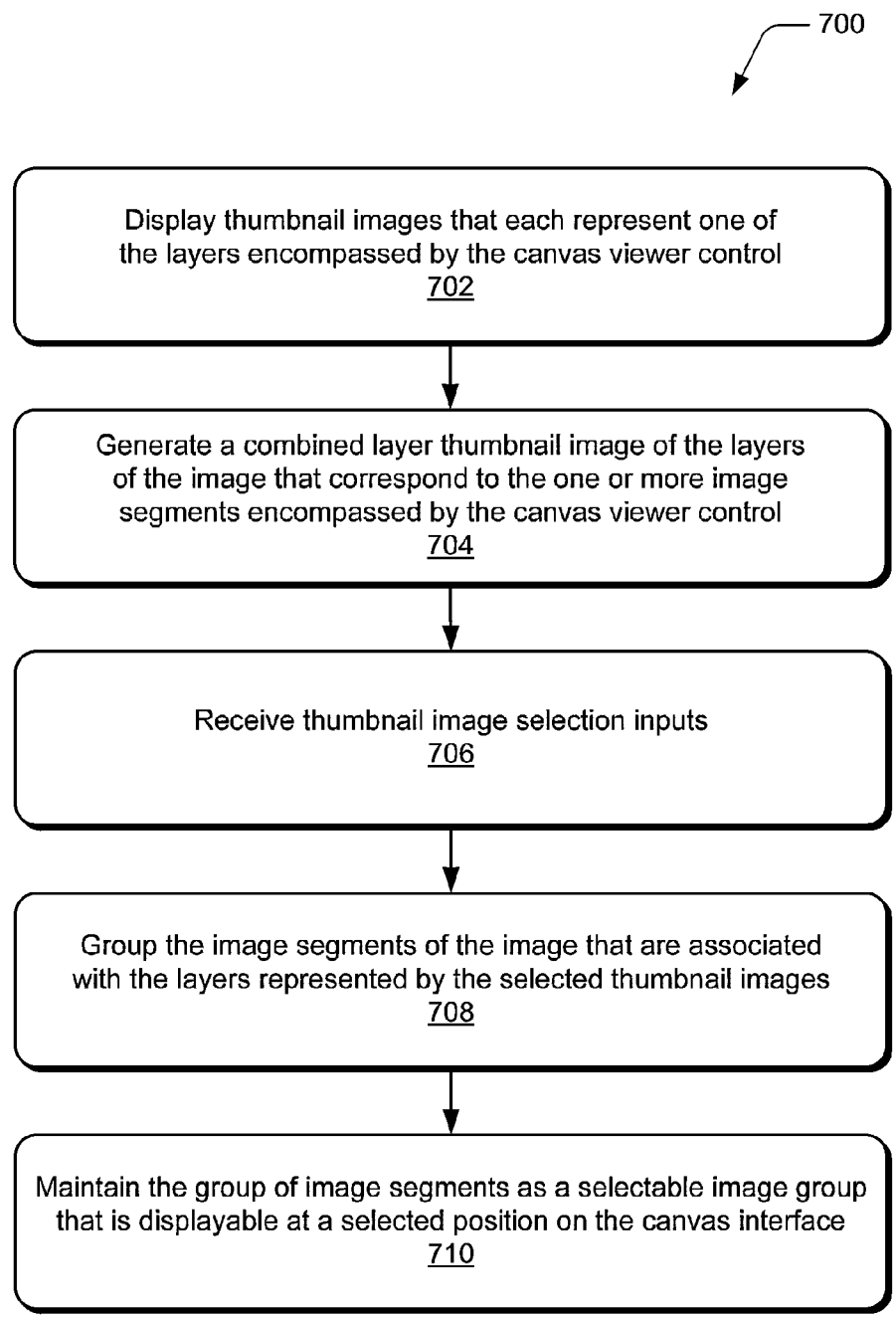
FIG. 7 illustrates example method(s) of image layers navigation in accordance with one or more embodiments.

FIG. 7 illustrates example method(s) 700 of image layers navigation, and is generally described with reference to an image layers application implemented by a computing device. The order in which the method is described is not intended to be construed as a limitation, and any number or combination of the method operations can be combined in any order to implement a method, or an alternate method.

At 702, thumbnail images are displayed that each represent one of the layers encompassed by the canvas viewer control. For example, the image layers application 510 (FIG. 5) implemented by a computing device and/or at the cloud-based data service 502 initiates displaying the thumbnail images 202 (shown in FIGS. 2-4) that each represent one of the layers 114 encompassed by the canvas viewer control 150. Each of the layers represented by a thumbnail image 202 are displayed to include the one or more image segments 112 associated with a respective layer of the image. The thumbnail images 202 can be displayed in a displayable order based on a proximity of image segments displayed in the image 104 on the canvas interface 102.

At 704, a combined layer thumbnail image is generated from the layers of the image that correspond to the one or more image segments encompassed by the canvas viewer control. For example, the image layers application 510 generates the combined layer thumbnail image 206 of the layers 114 of the image object 110 in the displayed image 104 that correspond to the one or more image segments 112 encompassed by the canvas viewer control 150. The combined layer thumbnail image 206 is also displayed with the thumbnail images (at 702).

At 706, thumbnail image selection inputs are received and, at 708, the image segments of the image that are associated with the layers represented by the selected thumbnail images are grouped together. For example, the image layers application 510 receives thumbnail image selection inputs, such as when a user selects one or more of the displayed thumbnail images 202 that each represent one of the layers 114 encompassed by the canvas viewer control 150. The image layers application 510 then groups together the image segments 112 of the image object 110 displayed in the image 104 that are associated with the layers 114 represented by the selected thumbnail images.

At 710, the group of image segments is maintained as a selectable image group that is displayable at a selected position on the canvas interface. For example, the image layers application 510 initiates maintaining the group of image segments 112 as a selectable image group 402 that is displayable at a selected position on the canvas interface 102, such as when a user selects and positions the selectable image group 402 for display on the canvas interface.

Figure 8:
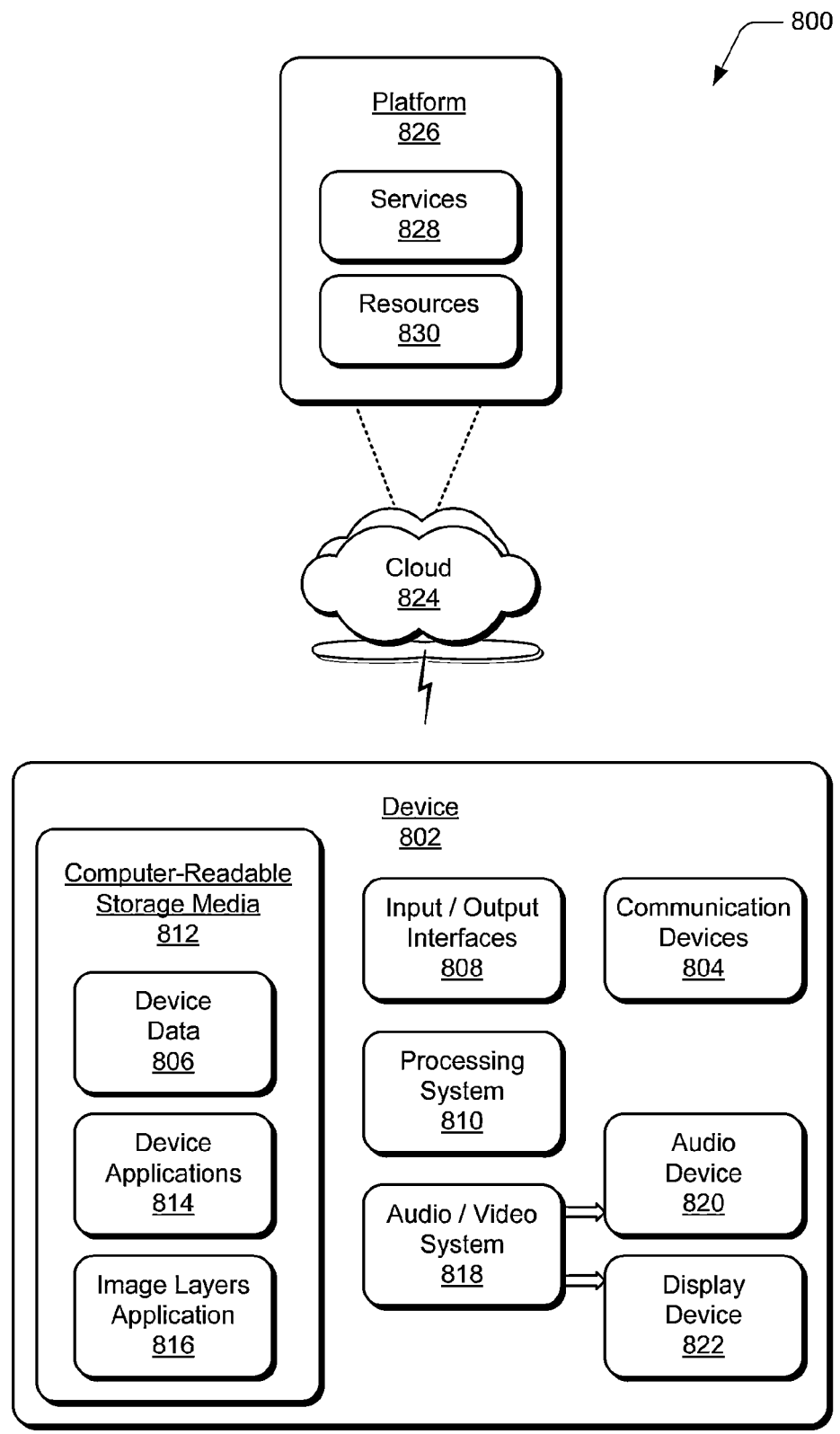
FIG. 8 illustrates an example system with an example device that can implement embodiments of image layers navigation.

FIG. 8 illustrates an example system 800 that includes an example device 802, which can implement embodiments of image layers navigation. The example device 802 can be implemented as any of the devices and/or server devices described with reference to the previous FIGS. 1-7, such as any type of client device, mobile phone, tablet, computing, communication, entertainment, gaming, media playback, and/or other type of device. For example, the computing device 504 and the data service 502, as well as any devices and data servers of the data service, shown in FIG. 5 may be implemented as the example device 802.

The device 802 includes communication devices 804 that enable wired and/or wireless communication of device data 806, such as the images 512 and other associated data. The device data can include any type of audio, video, and/or image data, as well as the images, thumbnail images, and selectable image groups. The communication devices 804 can also include transceivers for cellular phone communication and/or for network data communication.

The device 802 also includes input/output (I/O) interfaces 808, such as data network interfaces that provide connection and/or communication links between the device, data networks, and other devices. The I/O interfaces can be used to couple the device to any type of components, peripherals, and/or accessory devices, such as a digital camera device and/or display device that may be integrated with the device 802. The I/O interfaces also include data input ports via which any type of data, media content, and/or inputs can be received, such as user inputs to the device, as well as any type of audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage media 812, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 812 provides storage of the device data 806 and various device applications 814, such as an operating system that is maintained as a software application with the computer-readable storage media and executed by the processing system 810. In this example, the device applications also include an image layers application 816 that implements embodiments of image layers navigation, such as when the example device 802 is implemented as the data service 502 shown in FIG. 5. An example of the image layers application 816 includes the image layers application 510 implemented at the data service 502, as described with reference to FIG. 5.

The device 802 also includes an audio and/or video system 818 that generates audio data for an audio device 820 and/or generates display data for a display device 822. The audio device and/or the display device include any devices that process, display, and/or otherwise render audio, video, display, and/or image data, such as the image content of a digital photo. In implementations, the audio device and/or the display device are integrated components of the example device 802. Alternatively, the audio device and/or the display device are external, peripheral components to the example device.

In embodiments, at least part of the techniques described for image layers navigation may be implemented in a distributed system, such as over a "cloud" 824 in a platform 826. The cloud 824 includes and/or is representative of the platform 826 for services 828 and/or resources 830. For example, the services 828 may include the data service 502 as described with reference to FIG. 5. Additionally, the resources 830 may include the image layers application 510 that is implemented at the data service as described with reference to FIG. 5.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device embodiment with functionality distributed throughout the system 800. For example, the functionality may be implemented in part at the example device 802 as well as via the platform 826 that abstracts the functionality of the cloud 824.

Although embodiments of image layers navigation have been described in language specific to features and/or methods, the appended claims are not necessarily limited to the specific features or methods described. Rather, the specific features and methods are disclosed as example implementations of image layers navigation.

The invention claimed is:
1. A computing device, comprising:
a display device configured to display a canvas interface that displays image segments of an image in different layers of the image;

a processing system to implement an image layers application that is configured to:
  receive a position input of a canvas viewer control that encompasses one or more of the image segments of the image, the canvas viewer control being selectable to move around the canvas interface; and
  determine one or more of the layers of the image that correspond to the one or more image segments encompassed by the canvas viewer control.

2. The computing device as recited in claim 1, wherein the canvas viewer control is configured to:
  at least partially encompass the one or more image segments of the image; or
  fully encompass the one or more image segments of the image.

3. The computing device as recited in claim 1, wherein the position input of the canvas viewer control is received effective to select the one or more layers of the image that correspond to the one or more image segments encompassed by the canvas viewer control.

4. The computing device as recited in claim 1, wherein the image layers application is configured to initiate that one or more image segments of the image not encompassed by the canvas viewer control are displayed visually contrasted to indicate a non-selection of the one or more image segments.

5. The computing device as recited in claim 1, wherein the image layers application is configured to:
  receive a size input to increase a size of the canvas viewer control that encompasses additional layers of the image; or
  receive the size input to decrease the size of the canvas viewer control that encompasses fewer layers of the image.

6. The computing device as recited in claim 1, wherein the image layers application is configured to initiate a display of thumbnail images that each represent one of the layers encompassed by the canvas viewer control, each of the layers represented by a thumbnail image displayed to include the one or more image segments associated with a respective layer of the image.

7. The computing device as recited in claim 6, wherein the image layers application is configured to:
  receive thumbnail image selection inputs;
  group the image segments of the image that are associated with the layers represented by the selected thumbnail images; and
  maintain the group of image segments as a selectable image group that is displayable at a selected position on the canvas interface.

8. The computing device as recited in claim 6, wherein the thumbnail images are configured in a displayable order based on a proximity of image segments displayed in the image on the canvas interface.

9. The computing device as recited in claim 6, wherein the thumbnail images include a combined layer thumbnail image of the one or more layers of the image that correspond to the one or more image segments encompassed by the canvas viewer control.

10. A method, comprising:
  receiving a position input of a canvas viewer control that encompasses one or more image segments of an image displayed on a canvas interface, the canvas viewer control being selectable to move around the canvas interface and the image segments displayed on different layers of the image;
  scanning the image displayed on the canvas interface to determine one or more of the layers of the image that correspond to the one or more image segments encompassed by the canvas viewer control; and
  displaying thumbnail images that each represent one of the layers encompassed by the canvas viewer control, each of the layers represented by a thumbnail image displayed to include the one or more image segments associated with a respective layer of the image.

11. The method as recited in claim 10, further comprising:
  receiving thumbnail image selection inputs;
  grouping the image segments of the image that are associated with the layers represented by the selected thumbnail images; and
  maintaining the group of image segments as a selectable image group that is displayable at a selected position on the canvas interface.

12. The method as recited in claim 10, further comprising:
  displaying one or more image segments of the image not encompassed by the canvas viewer control visually contrasted to indicate a non-selection of the one or more image segments.

13. The method as recited in claim 10, further comprising:
  receiving a size input to increase a size of the canvas viewer control that encompasses additional layers of the image; and
  said scanning the image to determine the additional layers of the image that correspond to one or more additional image segments encompassed by the canvas viewer control.

14. The method as recited in claim 10, further comprising:
  receiving a size input to decrease a size of the canvas viewer control that encompasses fewer layers of the image; and
  said scanning the image to determine the fewer layers of the image that correspond to the one or more image segments encompassed by the canvas viewer control.

15. The method as recited in claim 10, wherein said scanning the image to determine the one or more layers of the image is based on the canvas viewer control:
  at least partially encompassing the one or more image segments of the image; or
  fully encompassing the one or more image segments of the image.

16. The method as recited in claim 10, further comprising:
  displaying the thumbnail images in a displayable order based on a proximity of image segments displayed in the image on the canvas interface.

17. The method as recited in claim 10, further comprising:
  generating a combined layer thumbnail image of the one or more layers of the image that correspond to the one or more image segments encompassed by the canvas viewer control.

18. A computer-readable storage memory comprising an image layers application stored as instructions that are executable and, responsive to execution of the instructions by a computing device, the computing device performs operations of the image layers application comprising to:
  receive a position input of a canvas viewer control that encompasses one or more image segments of an image displayed on a canvas interface, the canvas viewer control being selectable to move around the canvas interface and the image segments displayed on different layers of the image;
  scan the image displayed on the canvas interface to determine one or more of the layers of the image that correspond to the one or more image segments encompassed by the canvas viewer control; and initiate a display of the thumbnail images that each represent one of the layers encompassed by the canvas viewer control, each of the layers represented by a thumbnail image displayed to include the one or more image segments associated with a respective layer of the image.

19. A computer-readable storage memory as recited in claim 18, wherein the computing device further performs operations of the image layers application comprising to:
receive thumbnail image selection inputs;
group the image segments of the image that are associated with the layers represented by the selected thumbnail images; and
maintain the group of image segments as a selectable image group that is displayable at a selected position on the canvas interface.

20. A computer-readable storage memory as recited in claim 18, wherein the computing device further performs operations of the image layers application comprising to:
receive a size input to increase a size of the canvas viewer control that encompasses additional layers of the image; or
receive the size input to decrease the size of the canvas viewer control that encompasses fewer layers of the image.

* * * * *